United States Patent [19]
Stobb

[11] 3,880,308
[45] Apr. 29, 1975

[54] SHEET STACK HANDLING METHOD

[75] Inventor: Anton R. Stobb, Pittstown, N.J.

[73] Assignee: Stobb, Inc., Clinton, N.J.

[22] Filed: Aug. 1, 1974

[21] Appl. No.: 493,671

Related U.S. Application Data

[62] Division of Ser. No. 409,733, Oct. 25, 1973, Pat. No. 3,853,234.

[52] U.S. Cl. ............................... 214/152; 214/6 C
[51] Int. Cl. ........................................... B65g 67/02
[58] Field of Search ............ 214/152, 301, 6 P, 6 C, 214/7

[56] References Cited
UNITED STATES PATENTS

| | | | |
|---|---|---|---|
| 2,773,607 | 12/1956 | Locke | 214/6 P |
| 3,329,286 | 7/1967 | Kurczak | 214/6 P |
| 3,393,811 | 7/1968 | Dankelmeier | 214/152 |
| 3,426,922 | 2/1969 | Massey | 214/310 |
| 3,513,991 | 5/1970 | McWilliams | 214/41 |
| 3,741,413 | 6/1973 | Friel | 214/309 |

*Primary Examiner*—Robert J. Spar
*Assistant Examiner*—Lawrence J. Oresky
*Attorney, Agent, or Firm*—Arthur J. Hansmann

[57] ABSTRACT

Sheet stack handling method wherein sheets are formed into a stack and are secured in the stack which is presented at a delivery station from which the stack is moved onto a pallet. The stack can roll down to a final position on the pallet, and rows of stacks can roll onto the pallet. The pallet is supported by means which permit the pallet to shift laterally of the rows, so that additional rows of stacks can be placed on the pallet, and the shifting is also done under gravity by having a slight declining angle for the pallet shifting. Control mechanism is associated with the pallet and includes a detector for sensing the stacks on the pallet, and it includes a releasable stop for permitting the pallet to shift when the row of stacks is complete. Thus the stacks are loaded onto a pallet and are then moved with the pallet to a distribution station where the stacks are unloaded, and the loading and unloading are both done under the influence of gravity by having the stacks roll on a decline and by having the pallet roll on a decline in the lateral shifting, as mentioned, and the stacks can then be moved or rolled to the feeding stations, and a switching mechanism is used for distributing the stacks from the distribution point into the selected feeding stations.

4 Claims, 11 Drawing Figures

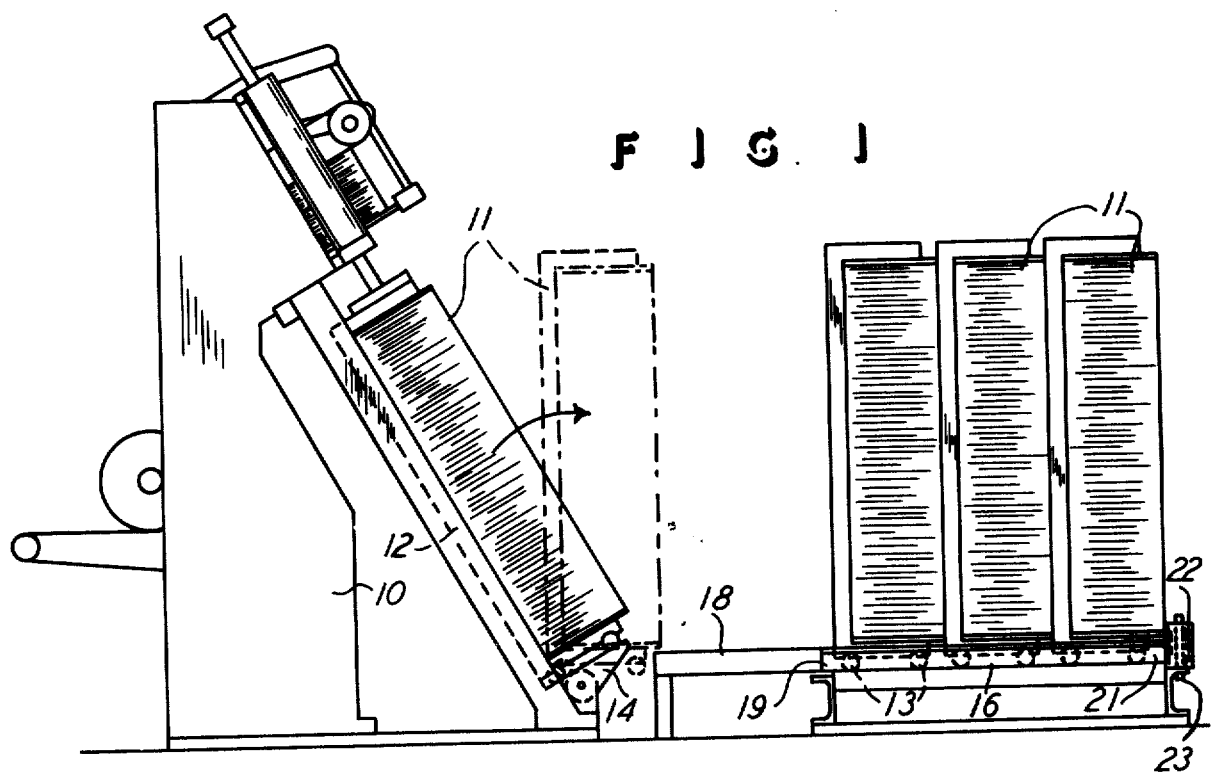
FIG. 1
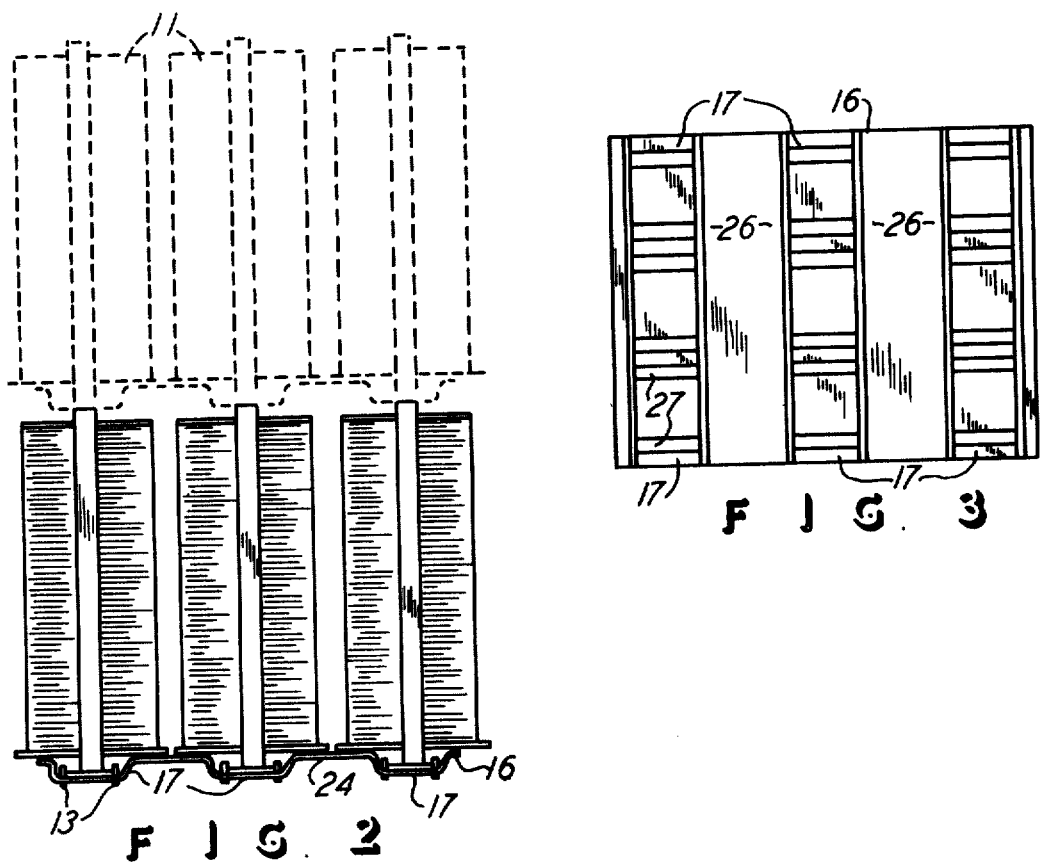
FIG. 2
FIG. 3

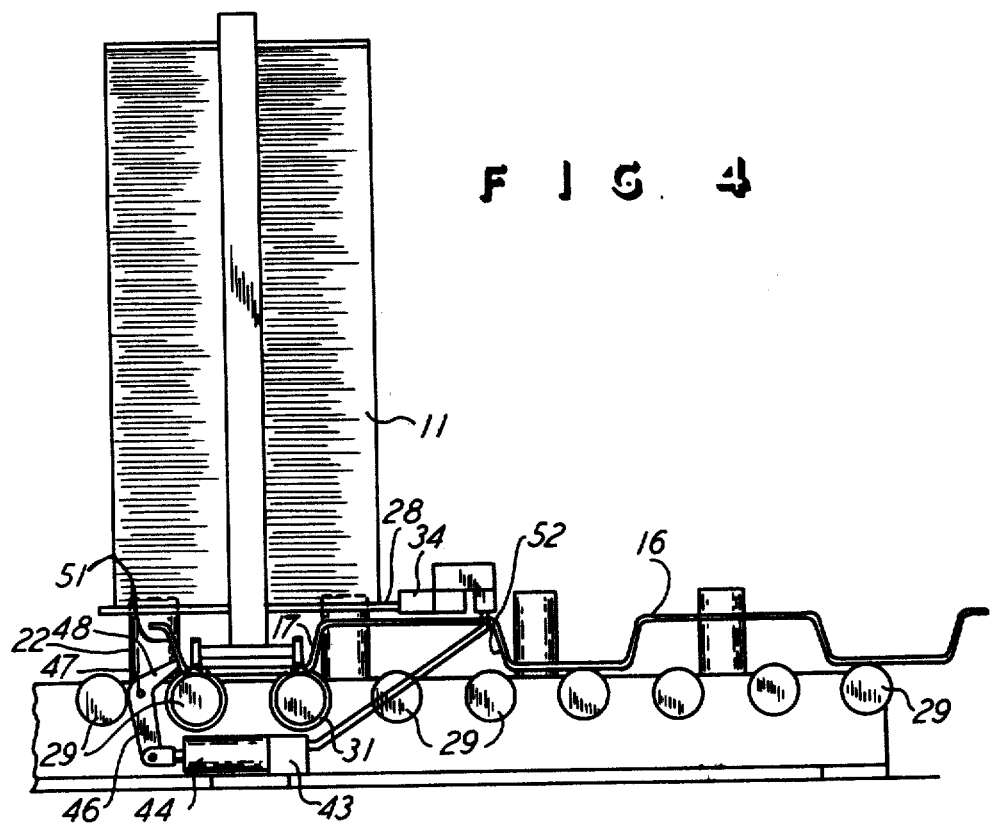
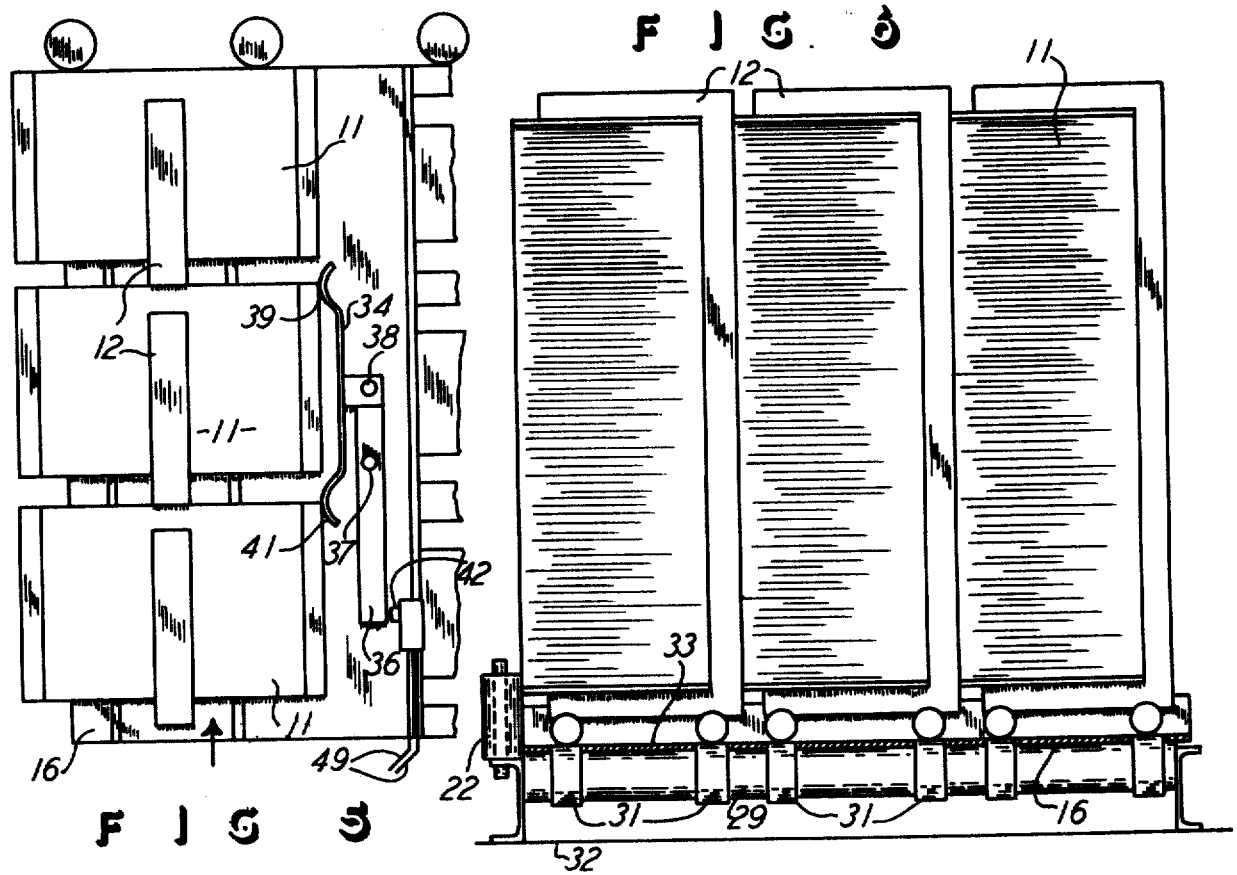

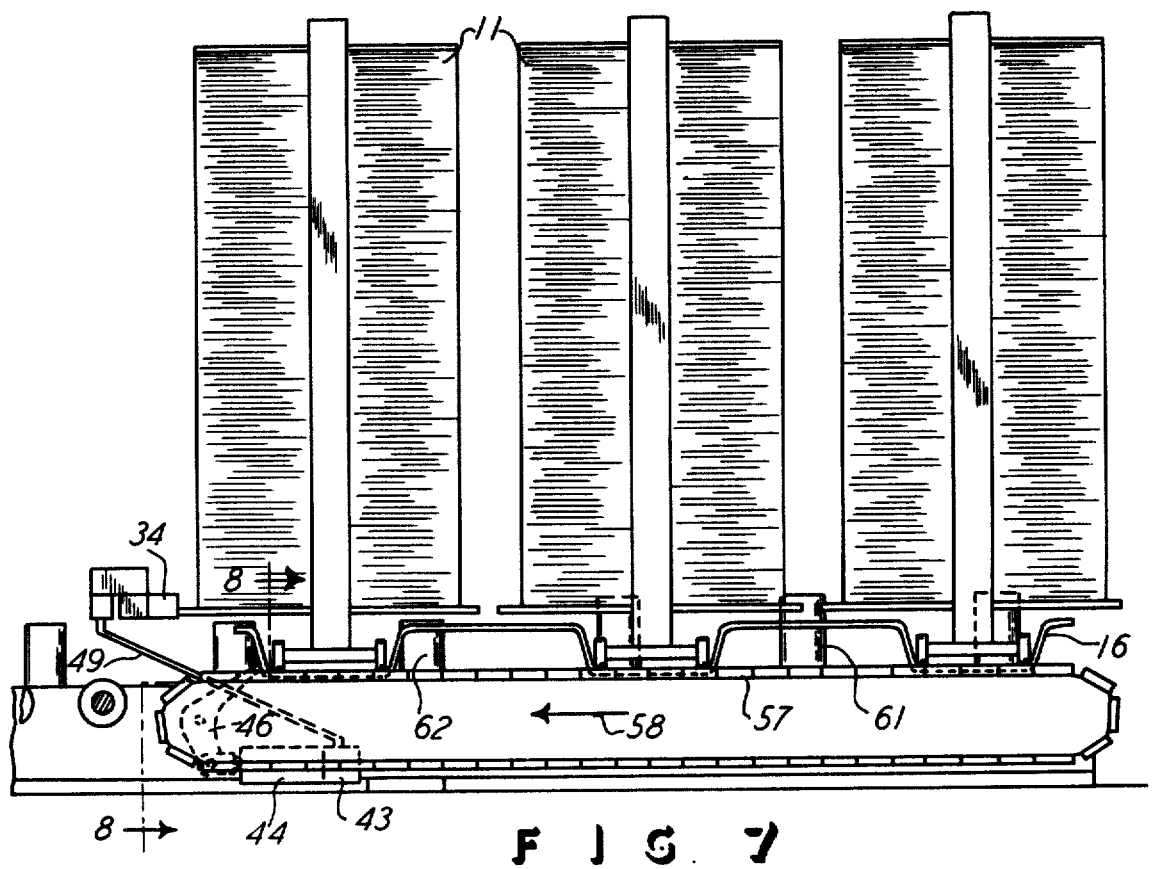
F I G. 7
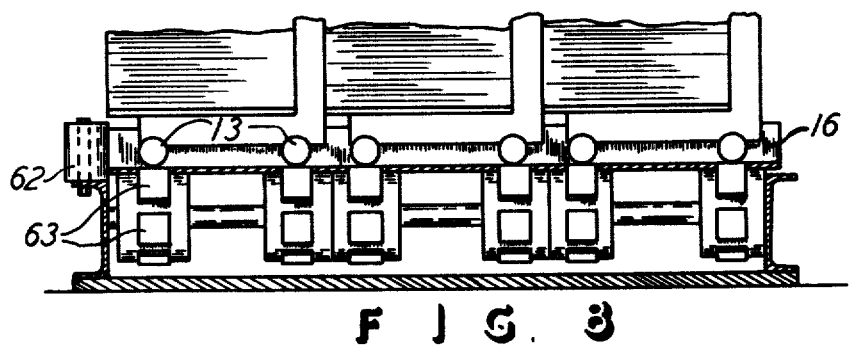
F I G. 8

SHEET STACK HANDLING METHOD

This application is a division of U.S. Pat. Application Ser. No. 409,733, filed Oct. 25, 1973, now U.S. Pat. No. 3,853,234 issued Dec. 10, 1974.

This invention relates to a sheet stack handling method, and, more particularly, it relates to a method for handling sheets coming from a printing press and/or folder and which forms the sheets into stacks and the stacks are then individually secured and are transported to a feeder mechanism which distributes the sheets individually off their stacks as the sheets are positioned or collated.

BACKGROUND OF THE INVENTION

In the printing and book and magazine manufacturing industry, the concern and problem is to take the printed sheets and collect them in stacks and to ultimately distribute the sheets in a manner where they can be formed into a magazine or a book or the like. The concern and problem in this regard is to rapidly collect the sheets in a stack form, to transport the sheets to a feeding station and to then take the sheets in single manner and collate theme to form the book or magazine. One example of stacking and forming sheets into discrete stacks and piles is shown in my U.S. Pat. No. 2,933,314, and this patent is included in this present disclosure by this reference since the showing in the patent is background for the disclosure herein, such as shown in FIG. 1 of the present application. As further background and disclosure supplementary to and similar to that in the present application is found in my U.S. Pat. No. 3,739,924 which shows the formation of sheets into stacks and the clamping of the sheets by means of a clamp having wheels thereon, and that patent also shows the transportation of a plurality of stacks and the ultimate distribution of the sheets from the stacks after the stacks are positioned on a feeder device.

The object of the present invention is to provide an improved sheet stack handling apparatus and method wherein the sheets can be taken from their stack form at the folder or the like and are subjected to an automated type of handling wherein the stacks are first collected in groups of stacks and are then tranported to a distribution station where they are distributed to various feeding devices which take the sheets off the stacks. In accomplishing this object, the purpose is to provide apparatus and a method wherein the sheets can be conveniently and efficiently handled in their stack form and the stacks can be transported throughout the plant to the distribution location and the feeding devices, as needed and desired.

Another object of this invention is to provide stack handling apparatus wherein the stacks are automatically collected in rows of stacks and wherein the stacks are secured in their rows when they are being transported from a collection or delivery station to a distribution station, and in both instances the stacks are mobilized and are moved with only a minimum of power and equipment required. Further, the present invention includes the improvement of the method for handling the stacks from the point of collecting them instack form and to the point of feeding them to the collating equipment. In accomplishing these objectives, there is only minimum of apparatus or equipment required, and this includes powered equipment, and the stacks themselves are simply contained on sets of wheels and are moved by rolling under the influence of gravity as the direction of rolling and the influence for the rolling is on a declining angle and thus no power equipment is required for positioning the stacks in groups of rows of stacks and also for distributing the stacks from those rows.

In considering the aforementioned problems and objectives, it will of course be understood that a printing plant commonly contains the printing press and the paper folder equipment in one plant or location on the general plant site, and the collating equipment, such as the feeding device, is generally located in another area remote from the printing press and the folder equipment. The concern and problem of course is to transport the stacks of sheets between the two areas mentioned, and this present invention accomplishes with a minimum of apparatus and especially powered equipment, and with a method which is an improvement over that heretofore employed.

Other objects and advantages will become apparent upon reading the following description in light of the accompanying drawings.

BRIEF DESCRIPTION OF THE DRAWINGS

FIG. 1 is a side elevational view of a portion of the apparatus of this invention.

FIG. 2 is an end elevational view of stacks on a pallet, and showing an upper deck of the same in dotted position.

FIG. 3 is a top plan view of the pallet shown in FIGS. 1 and 2.

FIG. 4 is a slightly enlarged end view of certain apparatus and showing a stack on one row of the pallet.

FIG. 5 is a top plan view of a portion of the apparatus shown in FIGS. 1 and 4 and showing one row of stacks and the detector equipment.

FIG. 6 is a side elevational view of the apparatus shown in FIGS. 4 and 5, and being partly in sections along the pallet and showing one row of stacks thereon.

FIG. 7 is an end elevational view of the equipment with the stacks and at the distribution station.

FIG. 8 is a sectional view taken along the line 8—8 of FIG. 7.

DETAILED DESCRIPTION OF THE PREFERRED EMBODIMENT AND THE METHOD

Figure 9:
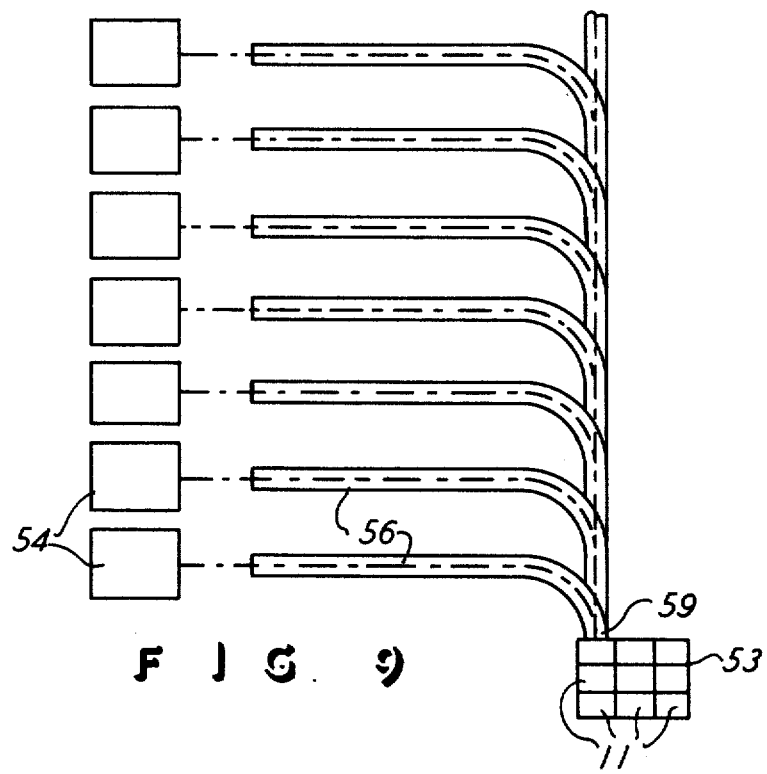
FIG. 9 is a schematic top plan view of the distribution station and the switching apparatus and the feeder stations.

The drawings show a folder device 10 which presents a stack of sheets 11 and on which a clamp or other retaining means 12 can be placed for holding the sheets in one discrete stack 11. The delivery device 10 can be a structure such as that shown in my U.S. Pat. No. 2,933,314, and an operator would place the clamp or retaining means 12 on the stack, and the clamp 12 also has the wheels 13 thereon, so the stack is provided with wheels and is therefore mobile. This arrangement may be like that shown in my U.S. Pat. No. 3,739,924.

The device 10 has a delivery station at and generally designated 14, and the stacks are moved from the solid line position shown in FIG. 1 and up to the dot-dash line position shown, by having an operator tip the stacks to the upright dot-dash line position, as indicated. The mobilized stacks can then roll on the wheels 13 and onto a pallet 16, and the stacks are collected on the pallet 16 in rows of three stacks in each of three rows, as shown in FIGS. 1 and 2.

The pallet 16 is thus provided with three trackways designated 17, and these trackways are shown to be depressed areas in the pallet 16, and the trackways can individually align with the delivery station 14 where the stacks are initially rolled onto a support or guide 18 to have the stacks roll along the trackway 17 which is then aligned with the delivery station 14. The pallet 16 is disposed at a declining angle, such that the pallet end designated 19 is slightly higher than the pallet end designated 21, and the difference in elevation between the two ends is determined by a 1½° slope on the pallet so that the stacks 11 will roll along the trackway 17 and away from the delivery station 14 and down to the position of the stack 11 on the right-hand side in FIG. 1. The stack on the right-hand side in FIG. 1 is thus the first one onto the pallet 16 and it rolls against an uprightly disposed stop 22 which is shown to be in the form of a roller having an upright axle 23 so that the roller can rotate about the axle 23 when the stacks and pallet 16 are shifted laterally of the direction of the trackways 17.

It will therefore be understood that three stacks 11 will roll, under the force of gravity, from the delivery station 14 and onto the pallet 16 and to the position shown in FIG. 1. When the one row of three stacks is on the pallet 16, the pallet 16 with the one row of stacks is allowed to shift to align another trackway 17 with the delivery station 14, and then three more stacks roll onto the pallet 16. The operation continues until a third row of stacks 11 is formed, and thus the pallet 16 is supporting nine stacks, as shown. It will also be seen that the pallet 16 has the two recesses 24 which can accommodate the fork of a lift truck which can pick up the pallet 16 with the nine stacks and transport the load to any desired position. FIG. 2 also shows that the pallet and nine stacks can themselves be positioned in two tiers, and the dotted positions of the stacks 11 in FIG. 2 show the upper tier of nine stacks supported on the lower tier shown in full lines, and such can be a storage condition for the stacks.

FIG. 3 shows the pallet 16 and its three trackways 17, and it also shows the raised portions 26 which define the areas for receiving the lift truck fork, as mentioned. Further, FIG. 3 shows that the trackways 17 have spaced-apart wells or openings 27 which are of a size sufficient to receive the stack wheels 13 so that, when the pallet 16 is raised, the wheels 13 will be received in the wells or openings 27 and thus the stacks are in a secure position, as shown in FIG. 2. However, in order to permit the stacks to roll into the position in the respective rows, as described, the openings or wells 27 are filled in or covered over by the apparatus described later, so the stacks can roll under the force of gravity and beyond the openings 27 to the respective positions of each of the three stacks 11 in each row thereof.

FIG. 4 shows the pallet 16 and one stack 11 disposed on the first or left-hand pallet trackway 17, as viewed in FIG. 4. It will therefore be understood that the stack 11 rolled onto the pallet 16 and along the trackway 17 until the stack 11 abuts the upright members 22 which extend sufficiently high to engage the base or board 28 on the lower portion of the stack 11, and that stops the stack 11 from further movement along the track 17. FIG. 4 also shows that the pallet 16 has a lower support, and this is shown to be a series of rollers 29, which are rotatably mounted and which provide the upright support for the pallet 16. The two of the rollers 29 which are immediately below or aligned with the loading trackway 17 have circular enlargements 31 which are aligned with and which project into the pallet openings 27 to permit the stack wheels 13 to roll through and beyond the openings 27, and FIG. 6 shows these enlargements 31 in the side view which is also a partly sectioned view of the pallet 16 extending along the axis of the roller 29. Thus the rollers 29 are supported on the floor designated 32, and they are rotatable about their longitudinal axes and therefore the pallet 16 can shift in the direction transverse to the longitudinal direction of the trackway 17. The rollers 29 are disposed at different elevations such that they provide a declining angle with respect to the horizontal and in the direction of shifting of the pallet 16 to the left as viewed in FIG. 4, and therefore the roller 29 on the right-hand side in FIG. 4 is at an elevation higher than the roller 29 on the left-hand side of FIG. 4 and of course all of the rollers inbetween are on that declining orientation.

At this time it will then be understood that there is apparatus and method whereby the stacks 11 are presented at the delivery station 14 and are provided with the wheels which permit the individual stacks to roll onto the pallet 16 and into the position against the stops or abutments 22 and along the then aligned trackway 17, such as shown in FIG. 4. When three such stacks 11 are on the left-hand trackway 17 as seen in FIG. 4, and it will be understood that these stacks 11 where thusly positioned by rolling downhill or under the force of gravity because of the slope or decline of the pallet 16, as described, then the pallet 16 will be shifted to the left, as viewed in FIG. 4, so that the next or center trackway 17 is aligned with the delivery station 14 and three more stacks 11 roll onto the pallet 16. In this lateral shifting, it will also be understood that the pallet supports 29 are on a declining angle so that the pallet 16 with the three stacks 11 will automatically shift to the left to position the center trackway 17, as mentioned. It will also be understood that in this arrangement the pallet 16 is shown, in FIG. 6, to be positioned against the abutments 22, and this positioning presents the roller enlargements 31 in the pallet openings 27 so that there is one smooth and planar surface 33 along the trackway 17 for the uninterrupted and gravitational movement of the stacks 11 along the trackways 17, and thus the relationship between the abutment 22 and the supports or enlargements 31 and the pallet 16 with its openings 27 is provided as described.

Therefore the first stack 11 rolls the full length of the trackway 17 and engages the abutment 22, and the second and third stacks 11 also move along the trackway 17 to their respective positions to form the first row of stacks, as seen in FIG. 4. FIGS. 4 and 5 show that when the first row is filled, that is when the second and third stacks are positioned as shown in FIG. 5, then there is detector apparatus which indicates that the row is filled and the pallet 16 is then ready to shift to the left, as viewed in FIG. 4, and the second row of stacks can then be positioned. FIG. 5 therefore shows a sensor or detector arm 34 which is pivotally supported on a pivot arm 36 pivotal on a pin 37. The arm 34 is in turn pivoted on the arm 36 through a pivot pin 38, and the arm 34 has two ends 39 and 41 which are shown in contact with the second and third stacks in FIG. 5. In that position in FIG. 5, the detector arm 36 engages a switch 42 which is then actuated and sends a signal to a solenoid or the like at 43 which in turn controls an air supply to an air cylinder 44. The cylinder 44 is connected to an arm or latch 46 pivoted about a fixed point 47 and having an end 48 which extends up into the path of the pallet 16 in the FIG. 4 position. When the switch 42 is actuated as described, the switch, through its electric or other type of connections 49 signals the solenoid 43 to actuate the air cylinder 44 and rotate the stop 46 about its pivot 47 and thereby move the stop end 48 downwardly and out of the path of the pallet 16 to allow the pallet 16 and the first row of stacks 11 to shift to the left, as viewed in FIG. 4. Of course the stop end 48 is in abutment with the upright portion 51 of the pallet 16 to hold the pallet 16 against shifting to the left and under the force of gravity, as described, until the stop end 48 is moved downwardly and off the pallet upright portion 51. Once the pallet 16 is released and allowed to move to the left as viewed in FIG. 4, then it will move until the pallet portion 52 comes to the position of portion 51 of FIG. 4 and this would be against the stop end 48, and thus the center trackway 17 is aligned with the delivery station 14.

Referring again to the detector sensor portion 34, it will be understood that since the portion 34 is pivotal about the pin 38, the passing of two stacks 11 relative to the portion 34 will not pivot the arm 36 to the position of FIG. 5 and will therefore not actuate the switch 42. That is, not until all three stacks 11 are on the pallet 16 will the detector arm 34 be pushed by contact with the stacks 11 to the position to trip the switch 42, as described. The switch 42 can be a normally open switch, and as soon as the pallet 16 and the first row of stacks 11 commence to shift to the left, as viewed in FIG. 4, the switch will again close and re-set the cylinder 44 and the stop 46 to have the stop intercept the pallet by abutting the portion 52, as seen and as described. FIGS. 4 and 5 also show that the sensor or detector arm 34 is disposed with its hook ends 39 and 41 on the level of the stack support boards or plates 28 which slide over the ends 39 and 41 to position the arm 34 in the position shown in FIG. 5 only when three stacks 11 are aligned in one row adjacent the detector 34. Of course the switch 42, solenoid 43 and air cylinder 44 are of a conventional or well-known design, and the air cylinder is of a spring return type so that it will return itself to the position shown in FIG. 4 when the switch 42 is again in the open position.

Figure 11:
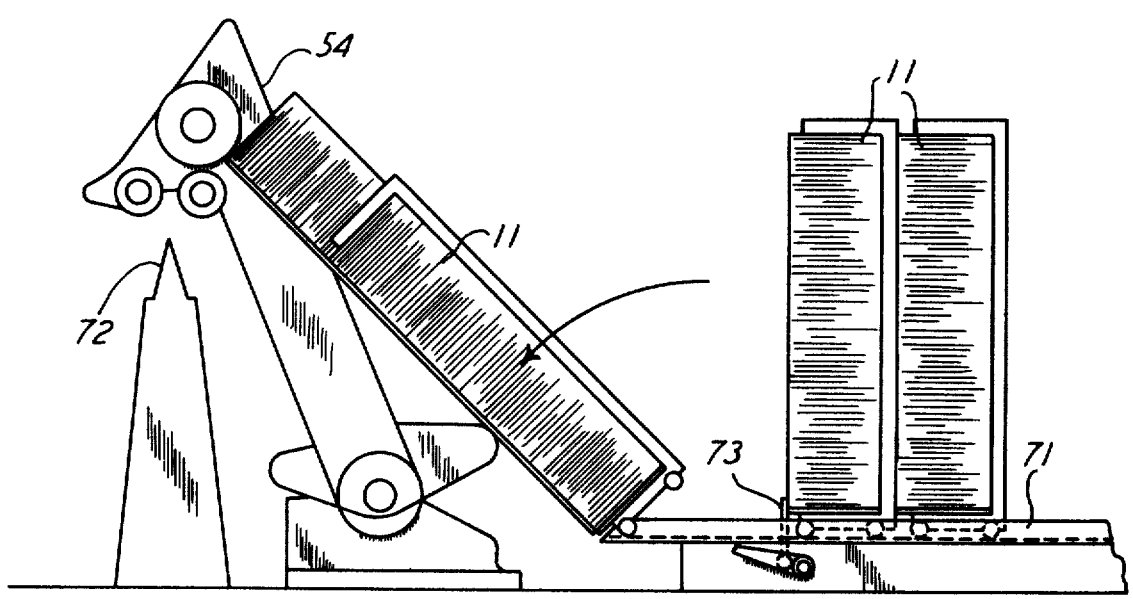
FIG. 11 is a side elevational view of the delivery device and showing the stacks related thereto.

After the stacks are positioned on the pallet 16, such as in the three rows of three in each row as shown and described by way of one example, a lift truck can take the pallet 16 and the nine stacks to a distribution station which is designated 53 in FIG. 9. From the station 53, the stacks are distributed to feeders designated 54, and here it is shown that there are seven such feeders and they are in communication with pathways or tracks 56. The tracks 56 are in flow communication with the station 53 and are also as shown in FIG. 10 so that there is a switching arrangement which permits the stacks 11 to roll from the distribution station 53 and to the selected one of the feeder devices 54 where the stack is handled as shown in FIG. 11.

FIG. 7 shows the fully loaded pallet 16 on a support 57 which is at the distribution station 53, and in this instance the support is shown to be of a chain type which moves its upper run in the direction of the arrow 58 to shift the pallet 16 to the left, as viewed in FIG. 7. However, the pallet 16 is again disposed at the declining angle, of perhaps 1 1/2°, and thus the stacks 11 individually roll under the force of gravity off the pallet 16 and on to the trackways 56 and then to the feeder devices 54, all of the movement being on the declining angle so that no powered equipment or handling equipment is required for distribution of the individual stacks 11 from the station 53. The distribution station 53 again has the detector mechanism of the arm 34 for engaging the stacks 11 and thereby determining the shift of the pallet 16 when one row of stacks 11 is rolled off the pallet 16 and it is desired to align the next row of stacks with the distribution exit station designated 59 in FIG. 9. Again the pallet 16 abuts the upright posts or stops 61, as shown in FIGS. 7 and 8, and the height of the abutments at the position aligned with the exiting row of stacks 11, namely the abutment posts 62, is less than the height of the post 61 so the stack boards 28 will clear the posts 62 and roll on to the distribution trackways 56. Also, the pallet 16 can shift to the left, as viewed in FIG. 7, and the detector 34 and its connection lines 49 are not in the path of movement of the pallet 16. Also, the support 57 has the projection 63 which are received in the pallet openings 27, as the projections 31 were received at the loading station, and thus the stack rollers 13 can roll over the pallet surface and through the opening 17 without falling therein. FIG. 7 also shows that a sensor, such as the sensor 43, and an air cylinder, such as the cylinder 44, and a stop, such as the stop 46 are provided at the distribution station 53 and operate as they do at the loading station, for the purpose of controlling the shifting of the pallet 16 since the support 57 positions the pallet 16 at the slight decline angle for the automatic shifting of the pallet 16.

It will therefore be understood that a lift truck will pick up the loaded pallet 16 and will position it on a distribution support, such as the support 57, which has the double declining angle relative to the horizontal, so that the stacks can roll downhill and off the pallet 16 and so that the pallet can roll downhill and shift to the left, as each row of stacks is exhausted.

Figure 10:
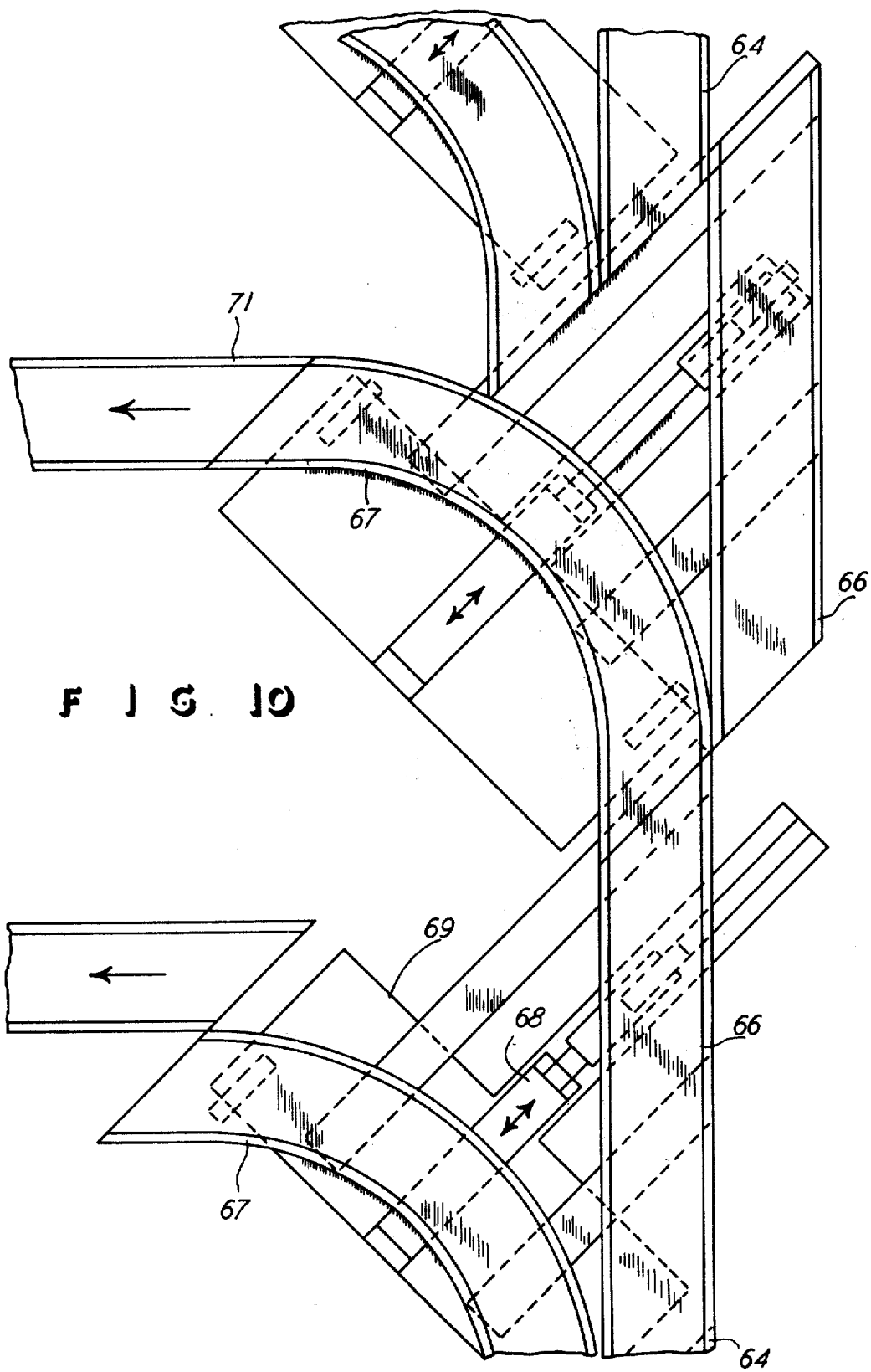
FIG. 10 is an enlarged plan view of the switching apparatus used at the distribution section and as shown in FIG. 9 and being a portion thereof.

FIG. 10 shows the switching arrangement of the distribution track 56, and here it will be seen that the entry or straight section 64 of the distribution tracks 56 extends to a straight section 66 and a quarter curved section 67, and the sections 66 and 67 are alternatively positioned with the base section 64 so that the stacks can roll on the respective aligned sections 66 and 67 to the feeder stations 54, as desired. Shifting mechanism is employed, and it may be in the form of a powered cylinder 68 which is suitably connected to a base portion 69 carrying both track sections 66 and 67 for shifting them relative to the straight portions 64 and the portions 71, respectively, leading to the feeder stations 54. That is, track sections are provided, and suitable powered shifters or switchers are provided so that the track portions can be switched for directing the rolling stacks to the desired one of the stations 54, and suitable mechanism may be employed for this support of the tracks described and for the switching of the tracks as shown and indicated in FIGS. 9 and 10.

FIG. 11 shows the stacks 11 at the feeder device 54, and here it will be seen that the active stack 11 is tipped to the position, as shown by the arrow thereon, and the feeder device 54 then takes the sheets individually and into the collating equipment, such as that indicated at 72. Here again a stop 73 may be employed for holding the stacks 11 in ready position and on the declining track section 71 so that the stacks 11 will be released and ready for movement into the delivery device 54.

The aforementioned describes the apparatus of the preferred embodiment for handling the stacks, and the method of handling the stacks is also described in the foregoing and in the realization that the sheets are collected into stacks and are made mobile by applying wheels thereto and are directed onto a pallet which is disposed at a declining angle so that the stacks can roll down on the pallet, and the pallet itself is supported at a declining angle so that it can shift laterally of the rows or trackways on the pallet, and the loaded pallet is then picked up and positioned to the distribution station 53 from whence the stacks are again rolled, by gravity, off the pallet and onto guides or trackways which have the stacks rolling on the decline and to the delivery devices 54, as described. In the method and the apparatus, the same arrangement can be made at both the loading point for the stacks 11 and the unloading point or station, though a slightly different support arrangement is shown between the two and relative to the pallet 16 but it will be understood that the same arrangement could be employed since the invention is to have the stacks roll under the force of gravity and at the slight declining angle and to have the pallet shift on the declining angle, as described. Other than as described herein, the feeding device and method are similar to that shown in U.S. Pat. No. 3,739,924.

Also, when the operator with the lift truck deposits the pallet and its nine stacks at the distribution station 53, he can actuate a switch which is not shown but which could be a conventional overhead type of electric switch, and the electric switch could be conventionally electrically connected with the switching means, such as the shifting means or pneumatic cylinder 68, all for distribution of the respective stacks 11 to however many respective stations there are so that the stacks 11 are evenly distributed, or distributed as needed, relative to the delivery devices 54. Also in description of the invention, including the method, there could be a visual signal, such as a light, which would indicate to the truck operator when more stacks are needed at the distribution station 53.

Therefore, the stacks 11 on the pallet 16, at both the loading station and at the distributing station, roll downhill from the entry end of the trackway to the exit end thereof and at the 1½° decline, and also the pallet 16 is supported laterally at a one and one-half degree decline angle for the lateral shifting of the pallet at both stations. With the 1½° decline, the stacks can roll onto the platform and abut the stops, such as the stop 22, without tipping over since the rolling under the force of gravity at that angle will not create momentum which would cause the stacks to tip over. Likewise, the lateral shifting of the pallet itself, being at the 1½° angle, will not cause the stacks to tip over in that lateral movement. Further, as shown in the drawings, the wells or openings 27 in the pallet trackways 17 are spaced relative to the edge of the pallet 16 adjacent the abutments 22 and 62, as seen in FIGS. 6 and 8, respectively, so that the stack wheels and the projections 31 and 63, respectively, align with the openings 27, for the purpose mentioned. Additionally, the openings 27 are arranged so that the three stacks 11 in one row will abut each other, as shown in FIG. 6 and FIG. 8, and the second and third stacks will also have their wheels aligned with the pallet openings 27 and with the support projections 31 and 63, respectively, all as shown. With this arrangement, the stack boards 28 can be and are shown to be of a size which will properly align the stacks in their rows so that the first stack is against the upright stop, as mentioned, and the other stacks are in abutment with the first stack and are also aligned with their openings in the pallet, as mentioned. Also, the side edges of the stack boards 28 are then available for engagement with the switch actuating sensor 34. It will further be understood that the mounting of the sensor or detector mechanism, such as the arms 34 and 36 and their attending parts, are all suitably supported in a position above the pallet 16 to permit the pallet 16 to be laterally shifted below the location of the detector, as described. So the 1½° declines are adequate to cause the stacks to roll to form their rows and adequate for causing the lateral shifting of the pallet with the stacks, both actions being free of generating momentum which would cause any tipping of the stacks, but yet permitting both movements to be under the force of gravity.

What is claimed is:

1. A method for handling stacks of sheets, comprising the steps of mobilizing said stacks by attaching wheels thereto, rolling said stacks onto a pallet, disposing said pallet at a declining angle to have said stacks roll downwardly on said pallet and form a row of said stacks, shifting said pallet with said row of said stacks laterally of said row, moving additional ones of said stacks onto said pallet in an additional row of said stacks, moving said pallet with said stacks thereon to a distribution station, and moving said stacks off said pallet.

2. The method as claimed in claim 1, including the steps of disposing said pallet at a second declining angle relative to the shifting of said pallet for effecting the shifting, and releasably holding said pallet against shifting until said rows are formed.

3. The method as claimed in claim 2, including the steps of disposing said pallet at a declining angle relative to the movement of said stacks off said pallet, for rolling movement of said stacks off said pallet.

4. The method as claimed in claim 2, including the steps of mechanically sensing the filling of said rows of said stacks, and shifting said pallet with said stacks in response to the sensing.

* * * * *